United States Patent [19]
Matsuki et al.

[11] Patent Number: 5,642,619
[45] Date of Patent: Jul. 1, 1997

[54] GAS GENERATING DEVICE

[75] Inventors: Masuo Matsuki; Haruyuki Ikesue, both of Kanagawa, Japan

[73] Assignee: NSK Ltd., Tokyo, Japan

[21] Appl. No.: 600,892

[22] Filed: Feb. 13, 1996

Related U.S. Application Data

[63] Continuation of Ser. No. 311,927, Sep. 26, 1994, abandoned.

[30] Foreign Application Priority Data

Sep. 30, 1993 [JP] Japan .................. 5-57367 U

[51] Int. Cl.⁶ ..................................... F01B 29/08
[52] U.S. Cl. ........................... 60/632; 280/806
[58] Field of Search ........................ 60/632; 102/530, 102/531, 216; 280/806, 805, 734; 297/480

[56] References Cited

U.S. PATENT DOCUMENTS

| | | |
|---|---|---|
| 3,638,501 | 2/1972 | Prachar . |
| 3,805,516 | 4/1974 | Eastham et al. . |
| 3,879,054 | 4/1975 | Lindblad . |
| 4,889,068 | 12/1989 | Tabata et al. . |
| 5,104,193 | 4/1992 | Föhl . |
| 5,119,634 | 6/1992 | Berry et al. . |
| 5,145,209 | 9/1992 | Lenzen . |
| 5,163,709 | 11/1992 | Mori . |
| 5,181,495 | 1/1993 | Gschwend et al. ............ 60/632 |
| 5,279,227 | 1/1994 | Nishizawa . |
| 5,383,388 | 1/1995 | Ono . |
| 5,388,499 | 2/1995 | Szyndlar ..................... 60/632 |

FOREIGN PATENT DOCUMENTS

| | | |
|---|---|---|
| 0591685 | 4/1994 | European Pat. Off. . |
| 41 09 990 | 10/1991 | Germany . |
| 41 09 623 | 10/1991 | Germany . |
| 3-132447 | 6/1991 | Japan . |

OTHER PUBLICATIONS

Patent Abstracts of Japan vol. 17, No. 547 (c–1116), Oct. 4, 1993 & JP–A–05 154 371 (Takata) Jun. 22, 1993—Abstract.

*Primary Examiner*—Ira S. Lazarus
*Assistant Examiner*—Alfred Basichas
*Attorney, Agent, or Firm*—Evenson, McKeown, Edwards & Lenahan, P.L.L.C.

[57] ABSTRACT

A gas generating device for use in a vehicle in the event of a collision has a hammer pin, a gas generator and a hammer pin trigger device. The gas generator includes a detonator, which is accommodated in a housing for being fired when struck by a hammer pin, and a gas-generating chemical reagent arranged in adjacent to the detonator. In the event of a collision of the vehicle, the hammer pin trigger device causes the hammer pin to strike the detonator. The gas generator has a cover arranged to substantially close an opening in the detonator. The opening faces the hammer pin trigger device. The cover has a hammer pin insertion hole configured to receive the hammer pin. The hammer pin insertion hole of the cover has an inner diameter not greater than 1 mm to prevent leakage of high-temperature and high-pressure gas, which is produced as a result of explosive burning of said gas-generating chemical reagent, to the side of said hammer pin trigger device.

8 Claims, 4 Drawing Sheets 5,642,619

1

GAS GENERATING DEVICE

This application is a continuation of U.S. patent application No. 08/311,927, filed Sep. 26, 1994, now abandoned.

BACKGROUND OF THE INVENTION a) Field of the Invention

This invention relates to a gas generating device for actuating a safety apparatus such as an air bag system or a webbing pretensioner of a seat belt system, for example, in the event of an emergency such as a collision of an automotive vehicle so that an occupant can be protected. More specifically, this invention is concerned with a gas generating device which has been improved to minimize leakage of high-temperature and high-pressure gas after firing of a detonator and also to avoid accidental actuation in the course of its assembling or mounting work.

b) Description of the Related Art

An air bag system and/or a webbing pretensioner has been used to protect an occupant in the event of an emergency such as a collision of an automotive vehicle. It is necessary to make these devices actuate instantaneously at the time of a collision, so that a gas generating device is employed to cause explosive combustion of a gas generating chemical reagent such as explosive for the generation of high-pressure gas.

These gas generating devices are available in two types, one being electrically fired and the other mechanically fired. Mechanical devices are however finding increasing popularity in recent years for their simpler construction and lower price.

As such a mechanical gas generating device, the gas generating device disclosed in Japanese Patent Application Laid-Open (Kokai) No. HEI 3-132447 is known. This mechanical gas generating device is provided with a small-diameter hole between a detonator and a gas-generating chemical reagent so that, after the detonator is struck, a flame from the detonator can be surely guided into a compartment with the gas-generating chemical reagent filled therein and the high-temperature and high-pressure gas produced from the gas-generating chemical reagent can be prevented from flowing backward to a side of the detonator. To ensure guidance of a flame, the small-diameter hole is defined to have a diameter of at least 0.5 mm and an overall length not greater than 8 times the diameter. To prevent a backward flow of high-temperature and high-pressure gas, on the other hand, the small-diameter hole is defined to have a diameter not greater than 1.2 mm and an overall length at least 5 times as great as the diameter. Namely, the diameter is in a range of from 0.5 mm to 1.2 mm while the overall length is in a range of from 5 to 8 times as great as the diameter.

For the provision of the small-diameter hole between the detonator and the gas-generating chemical reagent, the above-described mechanical gas generating device is accompanied by the following problems:

1) High-temperature and high-pressure gas from the detonator is substantially blocked by the small-diameter hole. Accordingly, the high-temperature and high-pressure gas produced from an explosive used in the detonator cannot be used effectively as webbing-winding power so that the gas-generating chemical reagent is required in a large quantity.

2) The high-temperature and high-pressure gas from the detonator leaks to a side of a hammer pin trigger device. It is therefore necessary to construct the hammer pin

2 trigger device strong enough to withstand the pressure of the gas. For example, substantially strength is required for a casing which accommodates the hammer pin trigger device.

3) The gas generating device unavoidably becomes longer because of the need for the provision of the small-diameter hole inside the gas generating device.

Referring now to FIGS. 3 and 4, a description will hereinafter be made of a further example of conventional gas generating devices.

FIG. 3 is a cross-sectional view of the conventional gas generating device as applied to the webbing pretensioner, and FIG. 4 is a cross-sectional view illustrating a problem inherent to the conventional gas generating device.

As is illustrated in FIG. 3, a frame 1 of a webbing retractor (not shown) for an unillustrated automotive vehicle, said frame having been formed by bending a steel plate, has a bracket 2 for mounting a gas generating device 90 on the webbing retractor. A pretensioner 10 and a hammer pin trigger device 20 are arranged on left-hand and right-hand side walls of the bracket 2 as viewed in the figure. The pretensioner 10 and the hammer pin trigger device 20 are fixed together by bolts 29, with the bracket 2 being held therebetween.

The pretensioner 10 is equipped with a substantially cylindrical housing 11 fixed on the bracket 2 and a cylinder 13 threadedly secured in an end portion of the housing 11 and extending upwardly. A gas compartment 12 inside the housing 11 and a chamber 14 inside the cylinder 13 are in mutual communication, and a piston 15 is slidably fitted in the cylinder 13. A wire cable 16 which is wound on a take-up spindle of the unillustrated webbing retractor is connected at a free end thereof to the piston 15.

A gas generator 30 is accommodated in an end portion of the housing 11, said end portion being on a side of the bracket 2. This gas generator 30 has a stepped, bottom-closed cylindrical casing 31, a gas generating chemical reagent 32 sealed in the casing 31, and a detonator 33 for firing the gas generating chemical reagent 32. The gas generator 30 is in threaded engagement with the housing 11 and, by a cover 37 substantially closing up a bracket-side opening of the housing 11, is held within the housing 11.

The hammer pin trigger device 20 has, as is depicted in FIG. 3, a bottom-closed cylindrical housing member 21 mounted on the bracket 2, an unillustrated hammer pin trigger mechanism equipped with an inertia member (not shown) accommodated within the housing member 21 for displacement upon application of a deceleration of at least a predetermined value thereon in the event of a collision, a hammer pin 27 disposed displaceably by the hammer pin trigger mechanism, a spacer 26 made of a metal or resin and defining a through-hole in which the hammer pin 27 is slidably and supportedly fitted, and a hammer pin side cover 25 disposed in an opening of the housing member 21 and covering and holding the hammer pin trigger mechanism and the spacer 26 within the housing member 21.

Operation of the above-described webbing pretensioner will next be described. Upon application of a deceleration of at least a predetermined value on the hammer pin trigger device 20 by a collision of an automotive vehicle or a like cause, the unillustrated inertia member causes the hammer pin 27 to displace so that the hammer pin 27 strikes the detonator 33. The detonator 33 so struck by the hammer pin 27 is ignited to fire the gas generating chemical reagent 32 arranged adjacent the detonator 33. The gas generating chemical reagent 32 so fired burns explosively, resulting in production of a large amount of high-temperature and high-pressure gas. This high-temperature gas instantaneously spreads from the gas compartment 12 inside the housing 11 of the pretensioner 10 to the chamber 14 inside the cylinder 13 so that the gas compartment 12 and the chamber 14 are filled up with the gas. As a consequence, the piston 15 is caused to abruptly move upwards within the cylinder 13 by a thrust of the expanding pressure of the gas, so that the wire cable 16 is pulled. As a result, the unillustrated take-up spindle around which the wire cable 16 is wound is caused to rotate in a webbing winding direction, whereby any slack in a webbing is taken up.

Incidentally, the hammer pin 27 in the conventional gas generating device 90 has, as is shown in FIG. 3, a uniform diameter except that a free end portion thereof which strikes the detonator 33 is pointed and a longitudinal central portion thereof carries an upright flange against which the unillustrated inertia member collides.

Further, the inner diameter D1 (see FIG. 4) of a hammer pin insertion hole 38 formed in the cover 37 is set substantially larger than the outer diameter of the hammer pin 27 so that any misalignment between an axis of the hammer pin trigger device 20 and that of the gas generator 30 can be tolerated to avoid contact between the hammer pin 27 and a wall of the hammer pin insertion hole 38 and hence any loss in detonator-striking energy.

In the course of the assembly of the conventional gas generating device 90, specifically at the time point that the gas generator 30 has been held in place by the cover 37 subsequent to its placement inside the housing 11 as shown in FIG. 4, the detonator 33 is exposed to the outside through the hammer pin insertion hole 38 formed in the cover 37 and having the large inner diameter.

If a worker should accidentally insert a self-tapping screw 39 or the like, which is employed for the assembly of the gas generating device 90 or for the mounting of the gas generating device 90 on the unillustrated webbing retractor, into the hammer pin insertion hole 38 and should then strike the detonator 33, the gas generator 30 is triggered to blow out high-temperature and high-pressure gas. This is certainly very dangerous to the worker. The conventional gas generating device 90 is therefore accompanied by the above-described potential problem. As the hammer pin insertion hole 38 is large in this conventional example, the conventional gas generating device 90 also involves the problem that, after the detonator 33 is fired, the resulting high-temperature and high-pressure gas may leak out of the hammer pin insertion hole 38.

SUMMARY OF THE INVENTION

With the foregoing in view, the present invention has as a primary object the provision of a gas generating device which minimizes leakage of high-temperature and high-pressure gas after firing of a detonator and which is free from any accidental triggering by a worker in the course of assembling or mounting work of the gas generating device.

In one aspect of the present invention, there is thus provided a gas generating device for use in a vehicle in the event of a collision, said gas generating device comprising:
 a hammer pin;
 a gas generator having a detonator, which is accommodated in a housing for being fired when struck by said hammer pin, and a gas-generating chemical reagent arranged in adjacent to said detonator; and
 a hammer pin trigger device for causing said hammer pin to strike said detonator;
 wherein said gas generator has a cover arranged to substantially close an opening in said detonator, said opening facing said hammer pin trigger device, said cover having a hammer pin insertion hole configured to receive said hammer pin, and said hammer pin insertion hole of said cover having an inner diameter not greater than 1 mm to prevent leakage of high-temperature and high-pressure gas, which is produced as a result of explosive burning of said gas-generating chemical reagent, to the side of said hammer pin trigger device.

According to the gas generating device of this invention, the inner diameter of the hammer pin insertion hole of the cover is formed not greater than 1 mm. The communication of the detonator with the hammer pin trigger device through the hammer pin insertion hole of the small diameter has brought about the following advantages:

1) In addition to high-temperature and high-pressure gas produced from the gas-generating chemical reagent, high-temperature and high-pressure gas from the detonator can also be used effectively as webbing-winding power. The quantity of the gas-generating chemical reagent can therefore be reduced.

2) The hammer pin trigger device is protected from the high-temperature and high-pressure gas produced by the gas-generating chemical reagent and the detonator, because the high-temperature and high-pressure gas is prevented from leaking to the side of the hammer pin trigger device. This has made it possible to use a light-weight material such as a resin for a casing of the hammer pin trigger device.

3) The hammer pin insertion hole is located outside the gas generator, thereby making it possible to form the gas generator short or small. This means that the gas generator can be manufactured at lower cost. As the gas generator accounts for a substantial part of the overall manufacturing cost of the gas generating device, the reduction in the manufacturing cost of the gas generator can make a significant contribution for a reduction in the manufacturing cost of the gas generating device.

Further, the inner diameter of the above dimension is smaller than the outer diameter of a bolt to be employed for assembling or mounting said gas generating device or that of a tool to be employed for assembling said gas generating device. This has made it possible to prevent accidental insertion of the bolt or tool into the hammer pin insertion hole during assembly work of the gas generating device or its mounting work on a vehicle body, thereby eliminating the potential danger that the gas generator could be triggered by an accidental strike of the detonator by the bolt or tool in the course of such work. The present invention is therefore effective not only for improving the preciseness of the assembling and mounting work of the gas generating device but also for heightening the safety of such work.

DETAILED DESCRIPTION OF THE INVENTION AND PREFERRED EMBODIMENT

Figure 1:
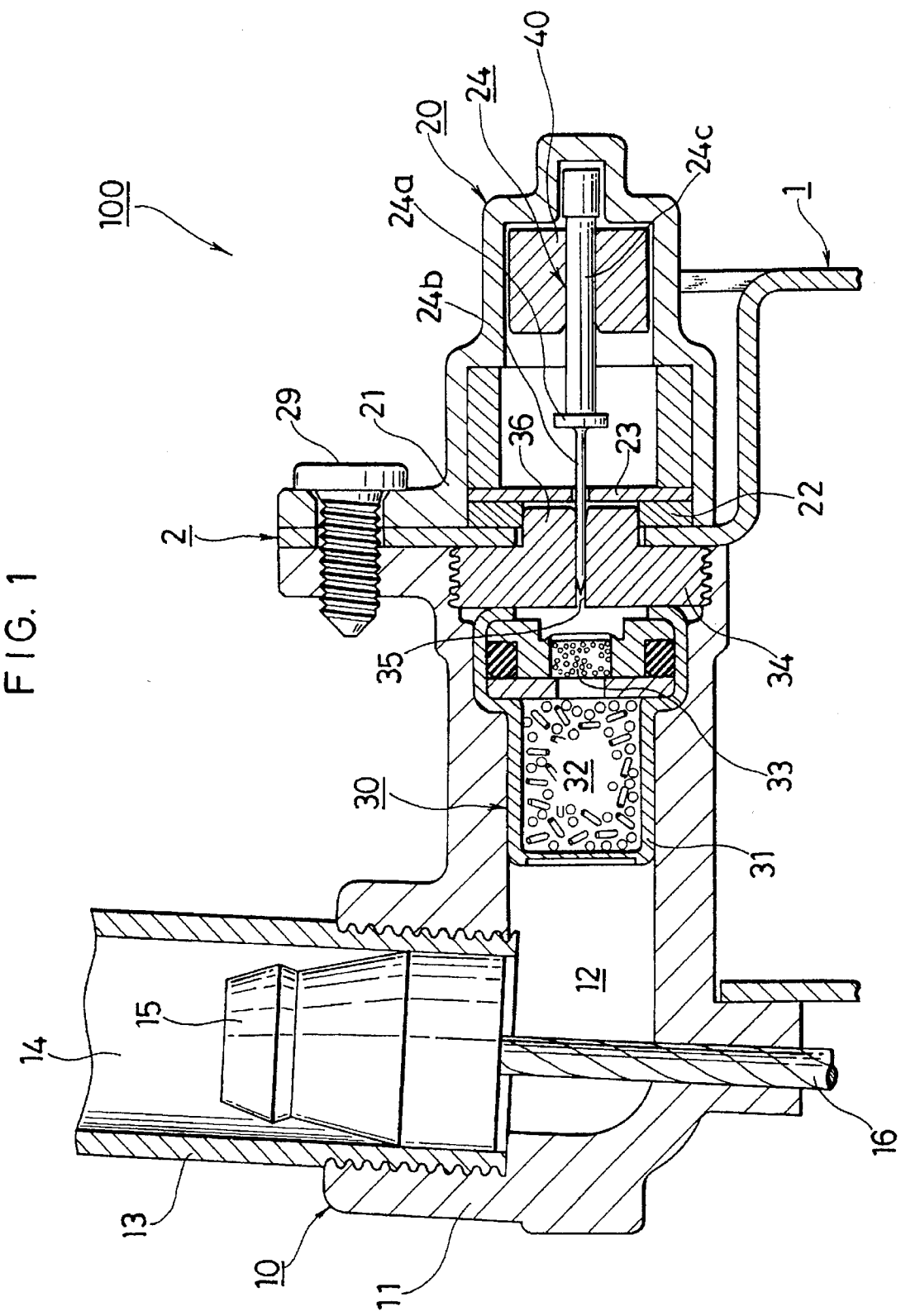
FIG. 1 is a cross-sectional view of a gas generating device according to one embodiment of the present invention as applied to a webbing pretensioner.

The gas generating device according to the one embodiment of the present invention will hereinafter be described with reference to FIGS. 1 and 2, in which elements of structure like the corresponding elements in the above-described conventional gas generating device are identified by like reference numerals and their description is omitted or simplified herein.

As is illustrated in FIG. 1, the gas generating device according to this embodiment, which is generally indicated by a numeral 100, is different from the conventional gas generating device in that a cover 34 for holding the gas generator 30 within the housing 11 as well as a hammer pin 24, a spacer 23 and a hammer-pin-side cover 22 of the hammer pin trigger device 20 are formed in different shapes from the corresponding elements in the conventional gas generating device.

Figure 2:
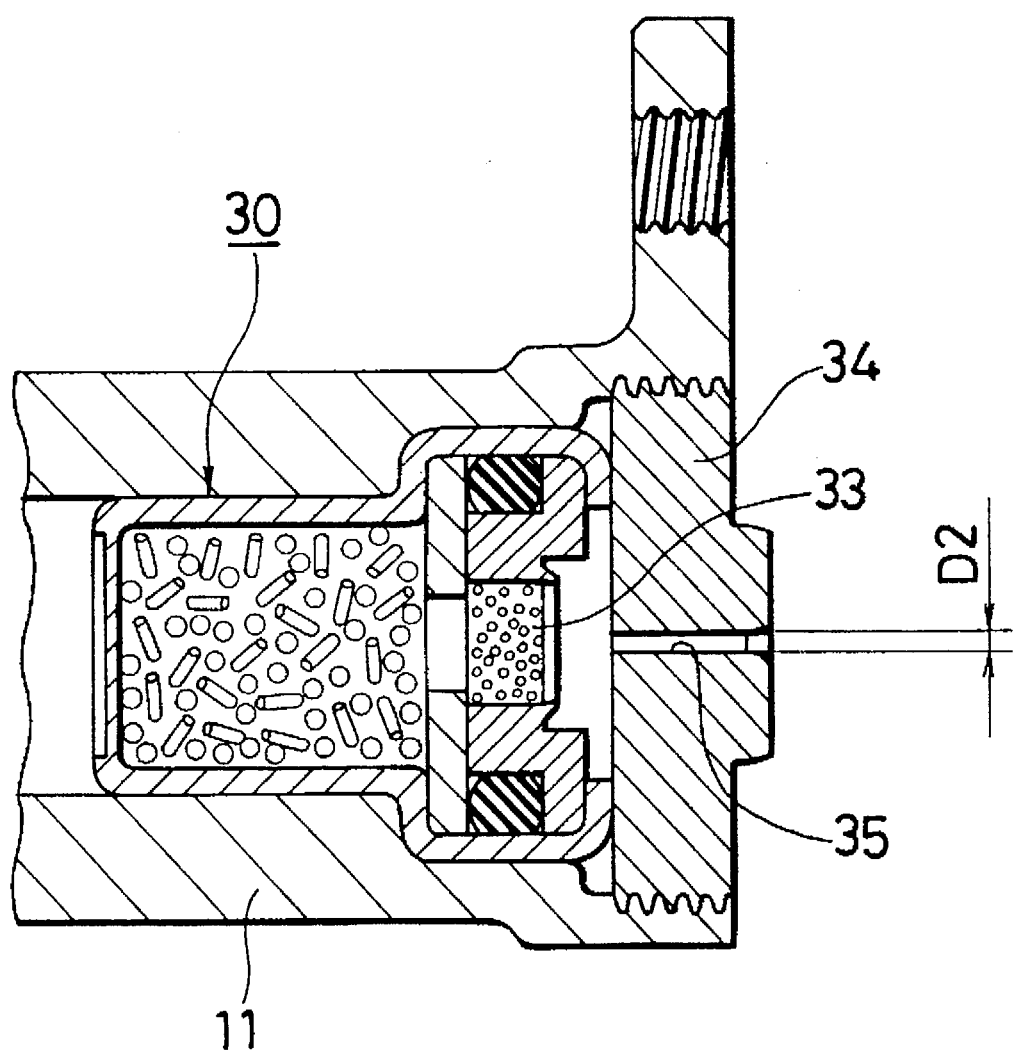
FIG. 2 is an enlarged fragmentary cross-sectional view of the gas generating device of FIG. 1.
Figure 3:
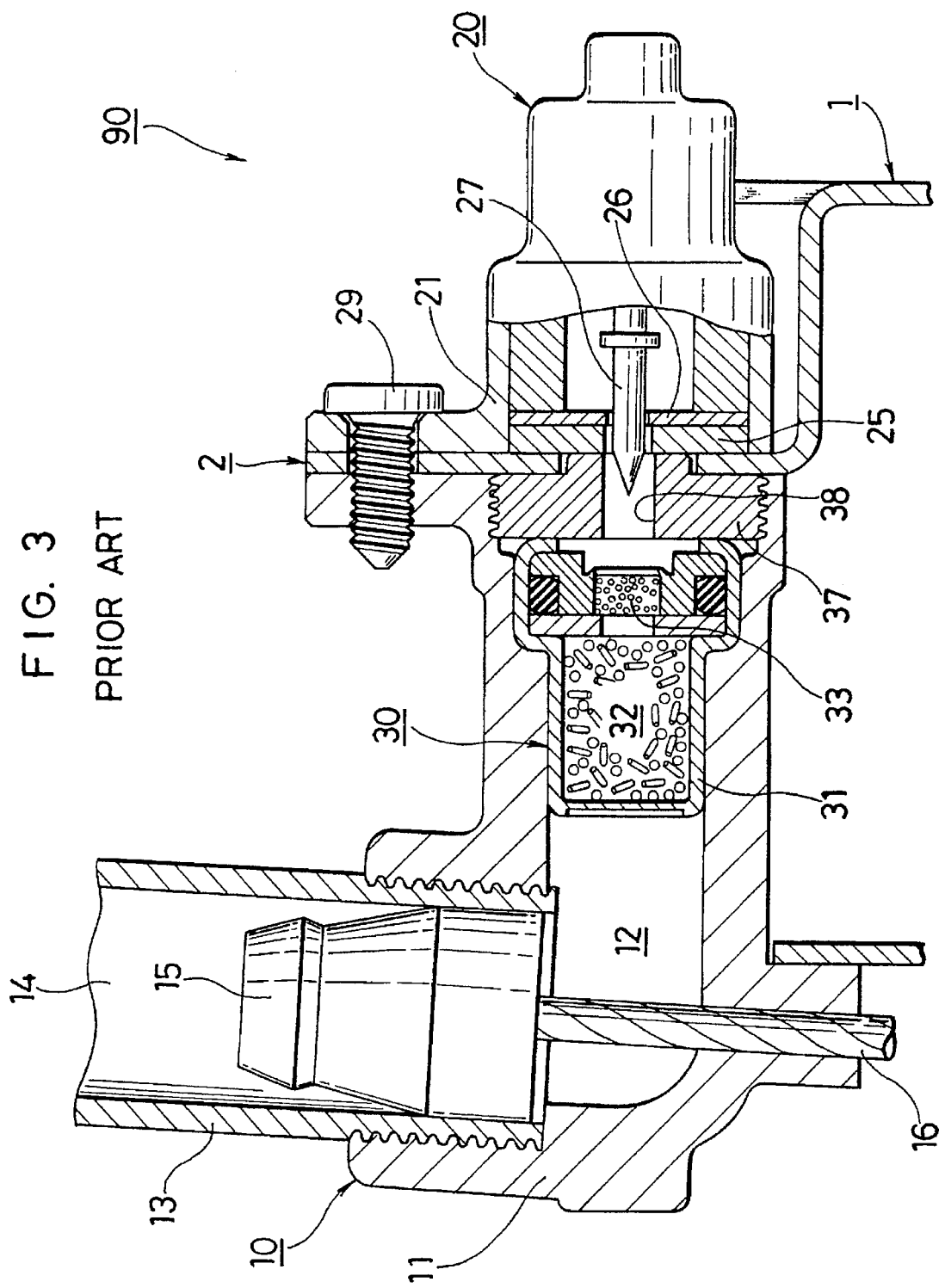
FIG. 3 is a cross-sectional view of a conventional gas generating device as applied to a webbing pretensioner.
Figure 4:
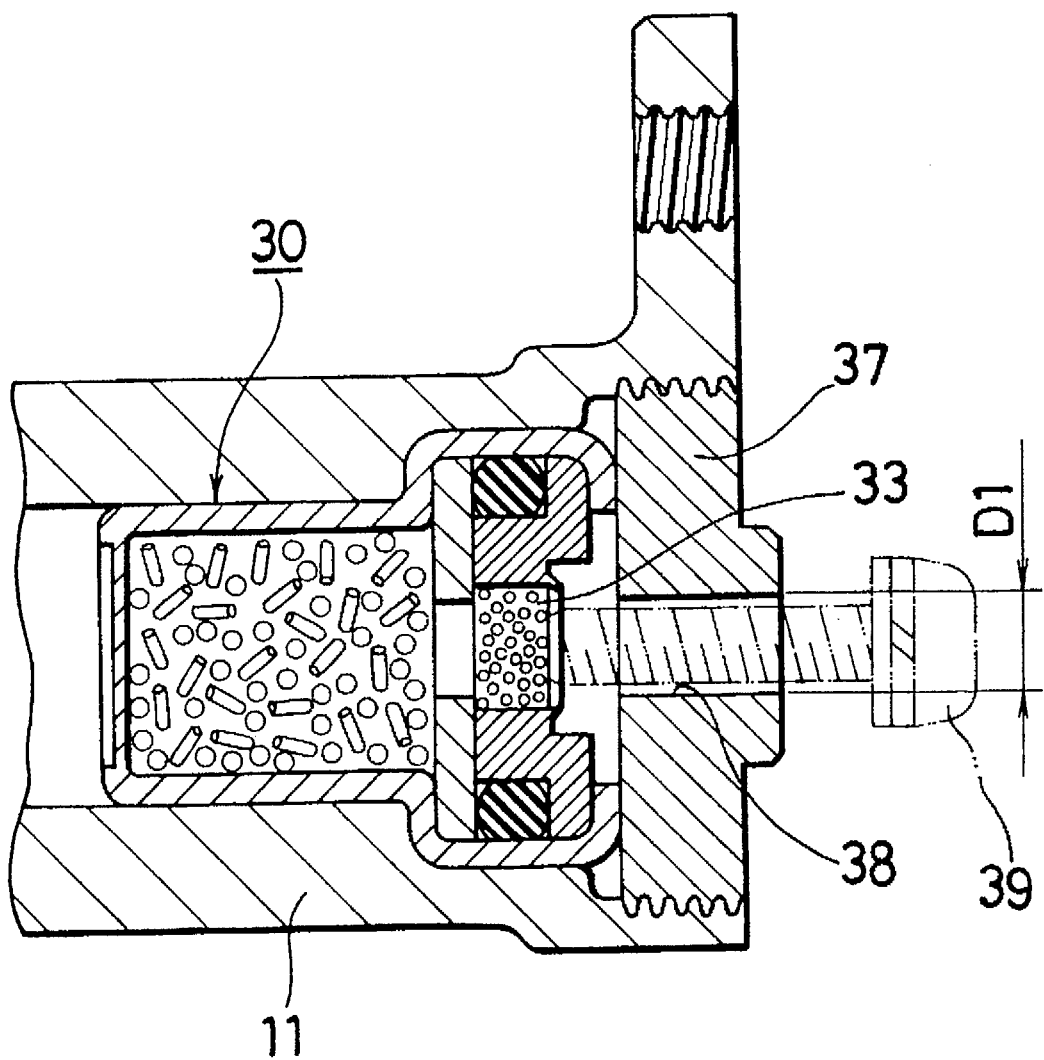
FIG. 4 is a cross-sectional view illustrating a problem inherent to the conventional gas generating device.

The cover 34 in this embodiment, notably the inner diameter D2 of a hammer pin insertion hole 35 is dimensioned as depicted in FIGS. 1 and 2 to avoid accidental insertion of fastening members, such as bolts, self-tapping screws, pins and the like, and tools such as screw drivers, which are employed for assembling the gas generating device 100 of this embodiment or for mounting it on a webbing retractor. Described specifically, the inner diameter of the hammer pin insertion hole 35 can be set at a value smaller than 3 mm, for example, at about 2.5 mm or so because the nominal diameter of self-tapping screws having a smallest diameter among those employed for the assembly is 3 mm. As will be described subsequently herein, it is preferred to set the inner diameter of the hammer pin insertion hole 35 at a still smaller value, for example, at 1 mm or smaller if it is desired to minimize leakage of combustion gas of the gas generating reagent 32 toward a side of the hammer pin trigger device 20. In this case, it is preferred to set the length of the hammer pin insertion hole 35 formed in the cover 34 at 5 mm or greater to minimize leakage of high-temperature and high-pressure gas.

In the illustrated embodiment, the cover 34 is provided with a cylindrical portion 36 so that the latter extends from the former toward a side of the hammer pin trigger device 20. This cylindrical portion 36 is arranged to align an axis of the gas generator 30 with that of the hammer pin trigger device 20, in other words, has centering function. Described specifically, the cylindrical portion 36 is constructed so that it extends toward the side of the hammer pin trigger device 20 and is internally fitted in a through-hole of the hammer-pin-side cover 22 of the hammer pin trigger device 20. Incidentally, the hammer pin 24 is arranged on the axis of the hammer pin trigger device 20, while the hammer pin insertion hole 35 is formed on the axis of the gas generator 30.

As a consequence, the axis of the hammer pin 24 and that of the narrow hammer pin insertion hole 35 are precisely aligned so that the hammer pin 24 does not unnecessarily contact a wall of the hammer pin insertion hole 35.

At a portion of the hammer pin 24, said portion extending toward the gas generator 30 from a flange portion 24a against which an inertia member 40 collides, the outer diameter of the hammer pin 24 is made smaller corresponding to the above-described hammer pin insertion hole 35, whereby a small-diameter portion 24b is formed. A further portion of the hammer pin 24, said further portion being located on an opposite side to the small-diameter portion 24b with respect to the flange portion 24a, is formed as a large-diameter portion 24c having a larger outer diameter than the small-diameter portion 24b so that the inertia member 40 is guided on and along the large-diameter portion 24c.

Further, a through-hole formed in the spacer 23, in which through-hole the hammer pin 24 is slidably and supportedly fitted, has an inner diameter reduced corresponding to the outer diameter of the small-diameter portion 24b of the hammer pin 24 and has been machined accurately, so that a deviation of the axis of the hammer pin 24 from the axis of the hammer pin trigger device 20 is minimized.

Owing to the above construction, the hammer pin 24 is free of the problem that the hammer pin 24 and the hammer pin insertion hole 35 may be misaligned and the hammer pin 24 may hence contact the wall of the hammer pin insertion hole 35.

According to the gas generating device 100 of this embodiment, the inner diameter of the hammer pin insertion hole 35 formed through the cover 34 which holds the gas generator 30 within the housing 11 of the pretensioner 10 is made not greater than 1 mm, thereby bringing about such an advantage that high-temperature and high-pressure gas formed as a result of explosive burning of the gas generating chemical reagent 32 does not leak out toward the hammer pin trigger device 20 through the hammer pin insertion hole 35. Further, the inner diameter of the above hammer pin insertion hole 35 is smaller than the outer diameters of bolts, screw drivers and the like employed in assembling and/or mounting work. This has made it possible to avoid the potential danger that a worker may insert one of such bolts, screw drivers and the like into the hammer pin insertion hole 35 to accidentally strike and trigger the gas generator 30. It is therefore possible to avoid accidental triggering of the gas generator in the course of assembling or mounting work. The potential danger of the above-mentioned accidental triggering during work has therefore been eliminated successfully.

In the present embodiment, the cylindrical centering portion 36 which is arranged on the cover extends toward the hammer pin trigger device 20 and is fitted in the hammer-pin-side cover 22. It is therefore possible with extreme ease to have the axis of the hammer pin insertion hole 35 aligned precisely with that of the hammer pin 24 and vice versa. This prevents the hammer pin 24 from accidentally contacting the wall of the hammer pin insertion hole 35 so that the hammer pin 24 is assured to strike the detonator 33 in the event of an emergency.

What is claimed is:

1. A gas generating device for use in a vehicle in the event of a collision, said gas generating device comprising:

a hammer pin;

a gas generator having a detonator, which is accommodated in a housing for being fired when struck by said hammer pin, and a gas-generating chemical reagent arranged in adjacent to said detonator; and a hammer pin trigger device for causing said hammer pin to strike said detonator;

wherein said gas generator has a cover arranged to substantially close an opening in said detonator, said opening facing said hammer pin trigger device, said cover having a hammer pin insertion hole configured to receive said hammer pin, and said hammer pin insertion hole of said cover having an inner diameter not greater than 1 mm to prevent leakage of high-temperature and high-pressure gas, which is produced as a result of explosive burning of said gas-generating chemical reagent, to the side of said hammer pin trigger device.

2. A gas generating device according to claim 1, wherein said hammer pin insertion hole defined through said cover has a length of at least 5 mm.

3. A gas generating device according to claim 1, wherein said hammer pin has a small-diameter portion facing said detonator, which small-diameter portion is received by said hammer pin insertion hole of said cover, and wherein said hammer pin has a large-diameter portion extending from said small-diameter portion in a direction away from said detonator.

4. A gas generating device according to claim 3, wherein said hammer pin trigger device comprises:

a substantially cylindrical housing member having a closed end and an open end;

a hammer-pin-side cover arranged at said open end; and a spacer arranged adjacent said hammer-pin-side cover and toward said closed end;

and wherein said spacer comprises a central through-hole configured to receive said hammer pin, and said through-hole has an inner diameter substantially equal to an outer diameter of said small-diameter portion of said hammer pin.

5. A gas generating device according to claim 1, wherein said hammer pin trigger device has an inertia member arranged on said hammer pin, said inertia member being displaced upon application of a deceleration of at least a predetermined value thereon, and wherein said hammer pin has a small-diameter portion located facing said detonator, said hammer pin has a contact portion which said inertia member contacts upon being displaced, said hammer pin has a large-diameter portion extending from said contact portion in a direction away from said diameter, and said inertia member is guided on and along said large-diameter portion.

6. A gas generating device according to claim 1, wherein said hammer pin is arranged on an axis of said hammer pin trigger device, said hammer pin insertion hole is formed on an axis of said gas generator, said gas generator and said hammer pin trigger device are provided with first and second centering means, respectively, and said first and second centering means mutually engage to align said axis of said gas generator with said axis of said hammer pin trigger device.

7. A gas generating device according to claim 6, wherein said first and second centering means are a cylindrical portion extending from said cover of said gas generator toward said hammer pin trigger device, and a hammer-pin-side cover arranged on said hammer pin trigger device, respectively.

8. A gas generating device according to claim 7, wherein said hammer pin trigger device comprises: a substantially cylindrical housing member having a closed end and an open end; and a hammer-pin-side cover arranged at said open end;

and wherein said cylindrical portion extending from said cover of said gas generator engages said hammer-pin-side cover.

\* \* \* \* \*